Nov. 18, 1958     W. B. RETZ ET AL     2,860,730
LOCATING AND LOCKING MECHANISM FOR A MACHINE TOOL
Filed Jan. 19, 1954     2 Sheets-Sheet 1

INVENTORS
WILLIAM B. RETZ
GEORGE A. CARDELL
BY
ATTORNEYS

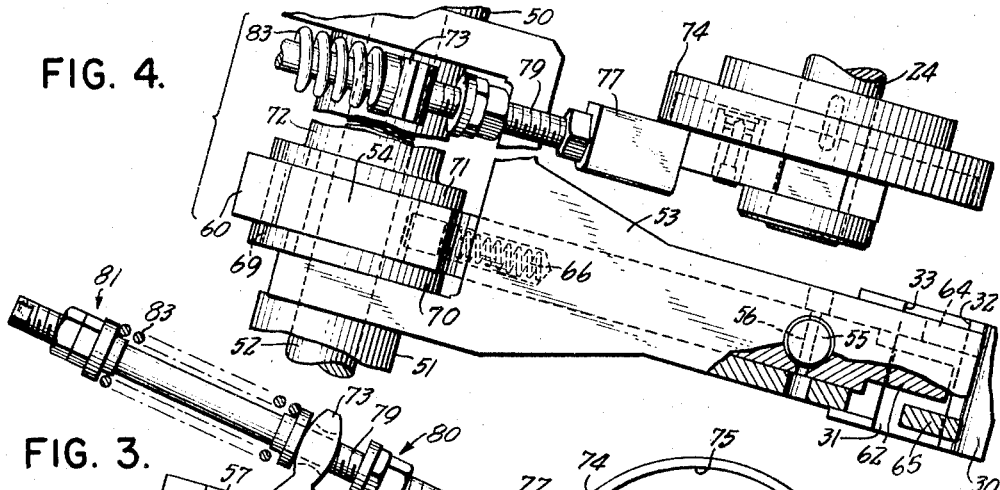

United States Patent Office 2,860,730
Patented Nov. 18, 1958

2,860,730
LOCATING AND LOCKING MECHANISM FOR A MACHINE TOOL

William B. Retz, Plainville, and George A. Cardell, New Britain, Conn., assignors to The New Britain Machine Company, New Britain, Conn., a corporation of Connecticut Application January 19, 1954, Serial No. 404,936

11 Claims. (Cl. 188—69)

Our invention relates to an automatic indexing machine and, in particular, to a multiple-spindle chucking machine. The present application incorporates certain improvements over that disclosed in U. S. Patent No. 2,656,587 to Donald H. Montgomery.

It is an object of the invention to provide an improved machine of the character indicated.

It is another object to provide improved locating and locking mechanism for automatic indexing machines.

It is a specific object to provide an improved locating and locking mechanism characterized by relatively small space requirements; so as to permit greater tool accessibility to work, and so as to constitute no impediment to the free removal of chips and waste or of the finished products of the machine.

It is a further specific object to provide such locating and locking parts in combination with a readily adjustable preloading means for turret-support bearings, whereby extreme accuracy in station location may be achieved for the various indexed positions of the machine.

Other objects and various further features of novelty and invention will be pointed out, or will occur to those skilled in the art from a reading of the following specification in conjunction with the accompanying drawings. In said drawings, which show, for illustrative purposes only, preferred forms of the invention:

Fig. 3 is an enlarged fragmentary sectional view in the plane 3—3 of Fig. 1;

Fig. 4 is a fragmentary top or end projection of certain parts shown in Fig. 3, the orientation of Fig. 4 with respect to that of Fig. 3 being such as to establish the projection; and Fig. 5 is a fragmentary view similar to Fig. 3, but illustrating an alternative form of certain parts shown in Fig. 3.

Briefly stated, our invention contemplates improved locating and locking means for accurately positioning the indexible turret of an automatic indexing multiple-spindle machine, as for example a so-called double-ended multiple-spindle machine, in which the turret is centrally located for simultaneous cooperation with separate batteries of spindles at both ends of the machine. The locating and locking mechanism features a unitary assembly which may be carried generally above the turret and rigidly anchored to the central frame pedestals, which also support the turret. With our mechanism, space is conserved by having the locating and locking parts function at only one general location on the turret for each indexed position of the turret; and for greater accuracy of station location, the abutment surfaces with which the locating and locking mechanism cooperates are carried at radially outwardly projected portions of the turret. Accurate control of station location may be maintained by readily accessible and serviceable preloading means for the main turret bearings, thereby avoiding any inaccuracies as might result from the development of play in such bearings.

Figure 1:
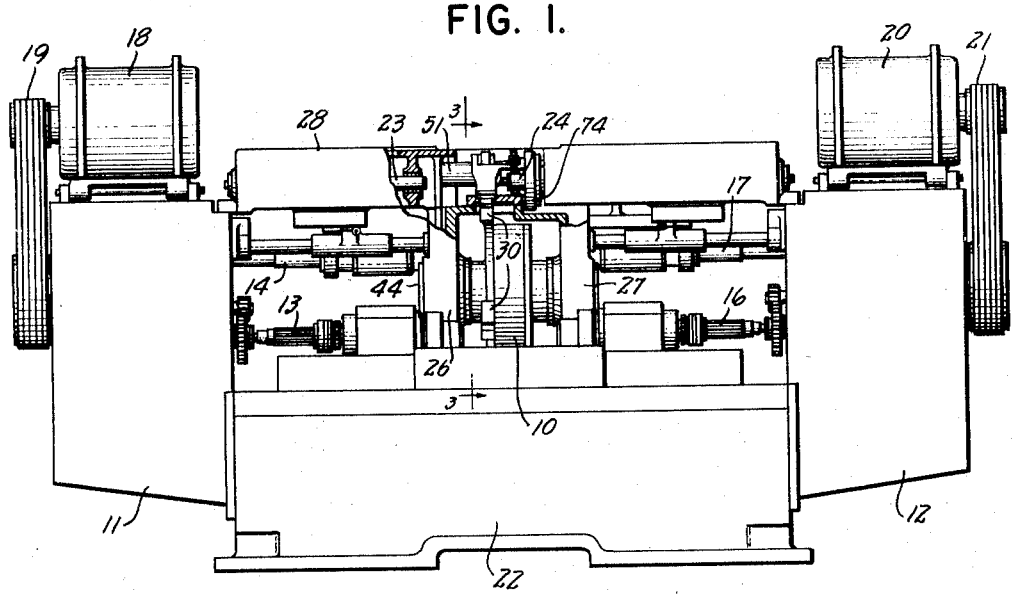
Fig. 1 is a front view in elevation of an automatic multiple-spindle chucking machine incorporating features of invention.
Figure 2:
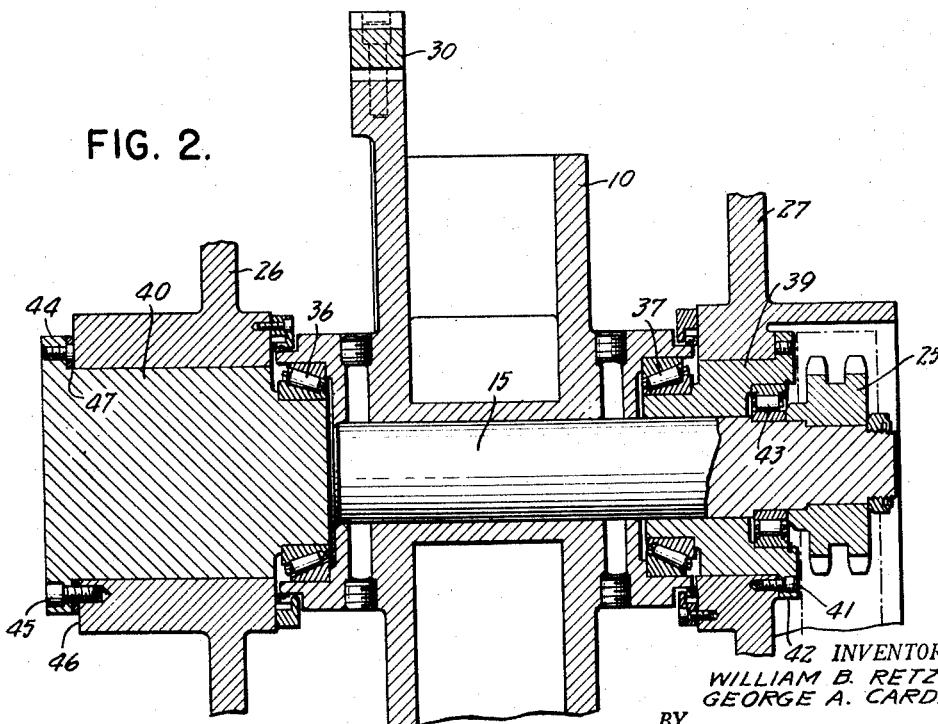
Fig. 2 is an enlarged fragmentary view in longitudinal section showing the turret and turret bearings for the machine of Fig. 1.

Referring to Fig. 1 of the drawings, our invention is shown in application to a double-ended multiple-spindle tool-rotating automatic chucking machine, including a centrally located turret 10 indexible about a longitudinally extending axis or shaft 15 (Fig. 2). Power cases 11—12 at opposite ends of the machine may carry the gears and other drive mechanism for one plurality of spindles 13—14 facing the turret 10 from one end of the machine and for another plurality of spindles 16—17 facing the turret 10 from the other end of the machine. Power may be provided independently at each end of the machine for separately driving each said plurality of spindles 13—14 and 16—17; in power case 11, a motor 18 is connected by belt means 19 to such drive mechanism, and, similarly, motor 20 drives mechanism in power case 12 by belt means 21. As explained more fully in the said Montgomery patent, the lower spindles may receive their respective feeds from cams on a lower camshaft (not shown) contained within the base 22 of the machine, and upper camshaft means may be employed for the feed of the upper spindles. For a reason which will later be clear, the upper camshaft means is in the form shown in two parts and thus comprises a left upper camshaft 23 driven by mechanism within power case 11 for feeding the left spindles, as at 14, and a right upper camshaft 24 similarly disposed for feeding upper spindles (as at 17) and driven from power case 12.

In timed relation with the feed program provided by the various camshafts for the spindles, we may employ indexing means of the general character described in said Montgomery patent. Indexing may thus be controlled by the lower camshaft and imparted by chain drive to sprocket means 25 on the turret-index shaft 15. The turret is preferably closely supported on opposite sides by upstanding frame pedestals 26—27 centrally located on the base 22 and connected at the upper end by a continuous longitudinally extending upper bridge or frame member 28, which also connects the power cases 11—12.

The locating and locking mechanism characteristic of our invention is of the type in which essentially one reference point on the turret is located and locked for each indexed position of the turret. For utmost reliability of station location, therefore, we prefer to develop a relatively wide anchoring base, as established between such locating-and-locking reference point and the center or index axis 15 of the turret. For this reason, we mount locating and locking abutment members 30 (Figs. 2 and 3) at radially outwardly projecting points spaced about the turret index axis, and we prefer that these points be as far outwardly located as may be tolerated by the bed-clearance requirements of the machine. We have shown the abutment means 30 as separate inserts removably secured to the turret body and preferably of hardened material, precision-ground appropriate to the particular index stations for which they are mounted. In the form shown in Fig. 3, each such abutment means 30 provides a groove 31 with opposed side walls 32—33 precision finished, as indicated, for achieving the locating and locking functions.

In order to permit ready maintenance of accurately centered journalled support for the turret 10, we prefer to employ opposed angular-contact antifriction bearing means 36—37 for the support of the turret and tapered-roller bearings are shown. The outer rings of the respective bearings 36—37 are accommodated in shouldered counterbores at the respective ends of the turret 10, and the inner bearing rings ride on plug inserts 39—40 fitted to the respective frame pedestals 26—27. The plug 39 is preferably more or less permanently secured in the pedestal 27, and bolts, as at 41, serve to anchor a flange 42 on the plug 39 for this purpose. Since the forces developed upon indexing the turret may constitute relatively great radial loads on the turret bearings, we prefer to provide radial-bearing means 43 for supporting the index shaft 26 on the plug 39, thus relieving the tapered-roller bearing 37 from excessive radial load.

As in the case of plug 39, the plug 40 may be flanged at its outer end 44, and bolts 45 may secure the flanged end to the corresponding frame pedestal 26. However, the flange 44 preferably axially clears the adjacent face 46 of the pedestal 26 so as to allow some take-up for wear in the bearings 36—37, thereby permitting adjustable preloading of such bearings. We show shim means 47 inserted in this clearance so that, for any preloaded adjustment, the parts may be completely secured. It will be noted that the described arrangement employing shims 47 lends itself to ready servicing because bolts 45 need only be removed in order to allow plug 40 to be extracted and a new shim inserted in place of the shim 47, as when necessary to take up the preload because of wear in the bearings 36—37.

As indicated generally above, we prefer that the locating and locking mechanism be carried at an upper location in the machine and, for ruggedness of mounting, we have shown this mechanism journalled in fixed bearings 50—51, which may form part of the pedestals 26—27, but which are shown as part of the top plate or frame member 28. The entire locating and locking mechanism may rock on a shaft 52 journalled in bearings 50—51, and we have shown the locating lever or arm 53 fixedly pivoted on said shaft 52. For compactness and operating efficiency, the locking lever or arm 54 may be carried and guided by the locating arm 53 and, in the form shown, the locating arm is of generally channel-shaped section, embracing the locking arm 54. Transversely intersecting pins 55—56 serve loosely to retain the two arms 53—54 together at one end and at the same time to allow limited relative radial movement of said arms with respect to the axis of shaft 52. At the other end, spaced guides or ways 57—58 are formed on opposed inner surfaces of the forked end of locking lever 54, and they ride on a guide bearing or boss 59 accommodated on shaft 52. The forked ends of lever 54 are bridged and connected together by a member 60 after preliminary assembly.

At their outer extended ends, the locating and locking arms 53—54 may be provided with appropriate abutment surfaces to engage the precision-finished surfaces 32—33 for location of the turret. On lever 54, the locking surface 61 is formed on a downwardly depending projection 62, and on lever 53 the locating surface 63 is formed on two transversely spaced downward projections 64—65 (Fig. 4). The turret is located and locked at a particular indexed station upon radially (with respect to shaft 52) squeezing the surfaces 63—32 and the surfaces 61—33 by means to be described.

We prefer that normally the arms 53—54 be urged, as by resilient means 66, in a direction of disengagement or freeing of the turret and that positive action, as by cam means, be employed to locate and secure the turret. In the form shown, this positive action is achieved by cam means involving a wedge surface 67 formed on the cap or bridge 60, and a slide block 68 rides the wedge surface. The block 68 is pinned at 69 to cranking means actuated about the shaft 52. This cranking means is shown to comprise two spaced flanges 70—71 embracing opposite sides of the arm 54 and joined by the boss or hub section 59, the pin 69 extending beyond both sides of the slide block 68 and therefore supported at both ends by the respective flanges 70—71. In order to actuate the cranking means, we show an extended boss 72 riding the shaft 52 and formed integrally with or at least secured to an actuating arm 73. Cam means 74 on the right upper camshaft 24 may provide the means for actuating the arm 73, in timed relation with the operating cycle of the machine.

In the form shown, the cam 74 is a plate cam having a program groove 75 accommodating a follower roll 76 mounted at the end of an actuating rod 77. The rod 77 may be forked and provided with guide surfaces, as at 78, to ride the camshaft 24 and thus to simplify orientation of the follower 76. The outer end of the rod 77 may be threaded at 79, and we show spaced adjustable lock nuts 80—81 for establishing adjustments in the actuation of arms 53—54. Stiffly resilient loading means 83 may be interposed between the actuating arm 73 and the outer lock nuts or stop 81.

In operation, the camshaft 24 will rotate once to establish a given tool-feed cycle for each indexed position of the turret, and the rise and fall of the cam 75 will be so coordinated with the indexing and feeding operations as to assure locating and locking before commencement of a feed and after the indexing mechanism has advanced the turret into its new position. In the relation of parts shown in Fig. 3, the mechanism is locked, with the slide block 68 advanced along cam 67 as far as permitted by the preloading means 83.

At the end of the spindle-feeding cycle, that is, when the tools have sufficiently cleared the work, cam 75 is effective to relieve spring 83 and to project the rod 77 outwardly, that is, to the left in the sense of Fig. 3, until such time as stop nuts 80 strike arm 73 and positively drive arm 73 counterclockwise, thus moving slide block 68 down the wedge slope 67. The locking bind at 61—33 and 63—32 will be immediately relieved, and an abutment 85 in the path of slide block 68 will intercept the latter; continued outward movement of rod 77 will force counterclockwise actuation of the entire locating and locking assembly, thus removing both surfaces 61—63 from the groove 31 at the turret station shown and permitting clearance for indexing of the turret. Frame-based radially resilient means 86 may serve to maintain control of the locating and locking mechanism at least while said mechanism has been removed from locking relation with the turret; spring 86 will also urge abutments 61—63 into the next groove 31 upon completion of indexing.

Upon completion of indexing, cam 75 will have further rotated to actuate rod 77 radially inwardly with respect to camshaft 24, thus allowing the assembly 53—54 to drop its locating and locking surfaces into the next groove 31 of the turret. Once this has taken place, continued further inward movement of the rod 77 will allow loading means 83 to drive slide block 68 upwards along cam 67 and thus squeeze the locking surfaces together for secure retention of the turret.

In adjusting the locating and locking mechanism for smooth operation, we prefer so to arrange the indexing mechanism that under the control of the indexing mechanism alone, the abutment groove 31 will have been slightly over-indexed as, for example, to a position in which the locating surface 32 assumes the position 32' (shown in dotted lines in Fig. 3). This will assure that when the locating and locking assembly is dropped initially into the groove 31, there will be no fouling of precision-finished edges or corners. We also prefer that the clearance or extent to which such over-indexing takes place, that is, the clearance represented by the distance between the two lines 32—32' in Fig. 3, shall be something less than and preferably substantially half of the total available stroke imparted by cam means 67—68 to the locking arm 54. This latter feature will be appreciated as also permitting clean drops of locating and locking surfaces 61—63 into a new slot 31 for each operation of the mechanism.

In Fig. 5, we show an alternative arrangement of locating and locking parts, for the situation in which the reference on the turret block 30' is a projection 31' instead of a slot or groove 31. The side walls of projection 31' may again provide the necessary locating and locking references, and we show locating surface 63' on locating arm 53' and locking surface 61' on locking arm 54'. The only difference in action in Fig. 5 is that, when secured, the side walls of reference projection 31' are squeezed together, rather than apart, as in Fig. 3, but the same basic mechanism for actuating arms 53—54 may be employed to actuate arms 53'—54', as will be understood.

It will be seen that we have described ingenious locating and locking mechanism adaptable basically to any indexing-station machine, but particularly adaptable to the double-ended chucker shown, for the reason that compactness and locating accuracy are simultaneously achieved in a readily maintainable structure.

While we have described the invention in detail for the preferred forms shown, it will be understood that modifications can be made within the scope of the invention as defined in the claims which follow.

We claim:

1. In a machine of the character indicated, a frame, an indexible turret journalled on a first axis in said frame, and a unitary locating and locking assembly journalled in said frame on a second axis off the turret-indexing axis and including parts engageable with two reference points carried by said turret off the axis thereof, one of said parts being journalled on said second axis and including abutment means engageable with one of said reference points, the other of said parts being guided by said first part for slidable movement radially of said second axis and including abutment means engageable with the other of said reference points, and cam means reacting between said two parts for laterally displacing said abutment means with respect to each other for firm anchorage of said reference points about said first axis.

2. In a machine of the character indicated, a frame, indexible means journalled on a first axis in said frame and carrying off said axis a reference abutment groove having opposed locating and locking side walls, and a unitary locating and locking assembly journalled in said frame on a second axis off said first axis and including parts engageable with said side walls, one of said parts being journalled on said second axis and including abutment means engageable with one of said side walls, the other of said parts being guided by said first part for movement radially of said second axis and including abutment means engageable with the other of said side walls, and means reacting between said two parts for laterally displacing said abutment means with respect to each other for firm anchorage of said reference-abutment groove about said first axis.

3. In a machine of the character indicated, a frame, indexible means journalled on a first axis in said frame and carrying off said axis a reference-abutment projection having opposed locating and locking side walls, and a unitary locating and locking assembly journalled in said frame on a second axis off said first axis and including parts engageable with said side walls, one of said parts being journalled on said second axis and including abutment means engageable with one of said side walls, the other of said parts being guided by said first part for movement radially of said second axis and including abutment means engageable with the other of said side walls, and means reacting between said two parts for radially displacing said abutment means with respect to each other for firm anchorage of said reference-abutment projection about said first axis.

4. As an article of manufacture, a unitary locating and locking assembly, comprising two arms with cooperating guide means for guided relative longitudinal displacement of said arms, journal means for one of said arms at one end thereof for supporting the same on a relatively fixed axis, reference-abutment means at the other end of said one arm, a locking abutment at the corresponding end of said other arm, and cam means including a part carried for rotation about said pivot axis and reacting directly against said other arm for displacing said arms relatively to each other and therefore also said abutments.

5. An assembly according to claim 4, in which the actuated end of said other arm includes opposed ways guided by said pivot means, and in which said cam means includes a wedge surface on said other arm and a slide block riding said wedge surface and carried by said rotatable means.

6. An assembly according to claim 5, in which spring means reacting between said arms normally urges said abutment surfaces apart.

7. An assembly according to claim 5, in which spring means reacting between said arms normally urges said abutment surfaces toward each other.

8. In a machine of the character indicated, an indexible turret including for each station thereof opposed adjacent locating and locking abutment surfaces, a locating and locking assembly comprising a fixedly pivoted locating arm with a locating surface for engagement with the locating surface of the reference abutment at one turret-index station, and a locking arm substantially coextensive with said locating arm and guided for radial movement with respect thereto and including at the outwardly extending end thereof a locking abutment for engagement with the locking-abutment surface at said one turret station, means normally resiliently urging said locking arm in a direction away from engagement with the locking surface at said turret station, and stiffly resilient preloaded cam means for actuating said locating arm in the direction for locking engagement with said turret.

9. A machine according to claim 8, in which said cam means includes an inclined wedge surface, and in which the actuating means for said cam means includes a slide block riding said wedge surface and cranked about the pivot axis for said locating arm.

10. A machine according to claim 8, in which said cam means includes an inclined wedge surface, and in which the actuating means for said cam means includes a slide block cranked about the pivot axis for said locating arm, abutment means on one of said arms and in intercepting relation with said slide block after relief of locking engagement with said turret, the direction of cranking to relieve locking engagement with said turret being such as to directly actuate both said locating and locking arms in a direction radially outward with respect to the index axis after relief of locking action.

11. In a machine of the character indicated, a frame including longitudinally spaced generally centrally located upstanding pedestals, an indexible turret between said pedestals and journalled in both pedestals on a longitudinally extending axis, and a unitary locating and locking structure journalled in said frame at a location generally above said turret, said locating and locking structure including separate locating and locking arms guided for relative movement radially of the axis of said upper journals and respectively including at their outer extended ends locating and locking abutments for cooperation with corresponding locating and locking abutment surfaces at each of successive turret-index positions, and means including an overhead camshaft at one end of said machine for actuating said locking and locating abutments in timed relation with an indexing of said turret.

References Cited in the file of this patent

UNITED STATES PATENTS

| | | |
|---|---|---|
| 574,162 | Prentice | Dec. 29, 1896 |
| 2,453,120 | Curtis | Nov. 9, 1948 |
| 2,576,651 | Super | Nov. 27, 1951 |
| 2,594,828 | Tripp | Apr. 29, 1952 |
| 2,634,178 | Chievitz | Apr. 7, 1953 |
| 2,656,587 | Montgomery | Oct. 27, 1953 |